United States Patent
Ichiyama

(10) Patent No.: US 6,664,686 B2
(45) Date of Patent: Dec. 16, 2003

(54) MOTOR HAVING SINGLE CONE AIR DYNAMIC BEARING BALANCED WITH SHAFT END MAGNETIC ATTRACTION

(75) Inventor: Yoshikazu Ichiyama, Kyoto (JP)

(73) Assignee: Kura Laboratory Corporation, Kyoto (JP)

(*) Notice: Subject to any disclaimer, the term of this patent is extended or adjusted under 35 U.S.C. 154(b) by 62 days.

(21) Appl. No.: 09/983,950

(22) Filed: Oct. 26, 2001

(65) Prior Publication Data

US 2003/0015930 A1 Jan. 23, 2003

(30) Foreign Application Priority Data

Jul. 23, 2001 (JP) ........................ 2001-221686

(51) Int. Cl.[7] .................... H02K 7/09; G11B 17/02
(52) U.S. Cl. .............. 310/90.5; 310/90; 360/98.07; 360/99.04; 360/99.08
(58) Field of Search .................... 310/90, 91, 67 R; 360/99.08, 99.04, 98.07; 384/100–120

(56) References Cited

U.S. PATENT DOCUMENTS

| | | | |
|---|---|---|---|
| 5,223,758 A | * 6/1993 | Kataoka et al. | 310/90 |
| 5,325,006 A | * 6/1994 | Uno et al. | 310/90 |
| 5,563,565 A | * 10/1996 | Hull | 310/90.5 |
| 5,587,617 A | * 12/1996 | Dunfield et al. | 310/90.5 |
| 5,598,048 A | * 1/1997 | Dunfield et al. | 310/90.5 |
| 5,789,839 A | 8/1998 | Langenbeck | |
| 5,808,839 A | * 9/1998 | Dunfield et al. | 360/106 |
| 5,854,524 A | 12/1998 | Lee | |
| 5,873,657 A | 2/1999 | Lee | |
| 5,947,608 A | 9/1999 | Kim | |
| 6,019,516 A | 2/2000 | Leuthold et al. | |
| 6,046,881 A | 4/2000 | Tielemans et al. | |

OTHER PUBLICATIONS

Extract of Japanese Utility Model Laid–Open Pub. No. 06-004731, dated Jan. 21, 1994.
Patent Abstract of Japan, No. 06-315242, dated Nov. 08, 1994.
Patent Abstract of Japan, No. 07-007886, dated Jan. 10, 1995.
Patent Abstract of Japan, No. 2000-004557, dated Jan. 07, 2000.
Patent Abstract of Japan, No. 2000-205248, dated Jul. 25, 2000.
Patent Abstract of Japan, No. 2001-027225, dated Jan. 30, 2001.
Patent Abstract of Japan, No. 2001-027226, dated Jan. 31, 2001.

* cited by examiner

Primary Examiner—Tran N Nguyen
(74) Attorney, Agent, or Firm—Armstrong, Westerman & Hattori, LLP

(57) ABSTRACT

A single cone air dynamic bearing motor, including a shaft having a diminishing conical taper surface, a sleeve having a concavity opposite the shaft, and magnetic members to generate magnetic attraction between the shaft end and the sleeve. Grooves are formed on the conical taper surface of the shaft or the sleeve so as to create load capacity when the motor rotates, whereby rotating parts of the motor are supported by the axial components of the load capacity balanced with the magnetic attraction. The motor thereby achieves reduction in thickness, current, and cost, and inhibits non-repeatable runout.

9 Claims, 11 Drawing Sheets

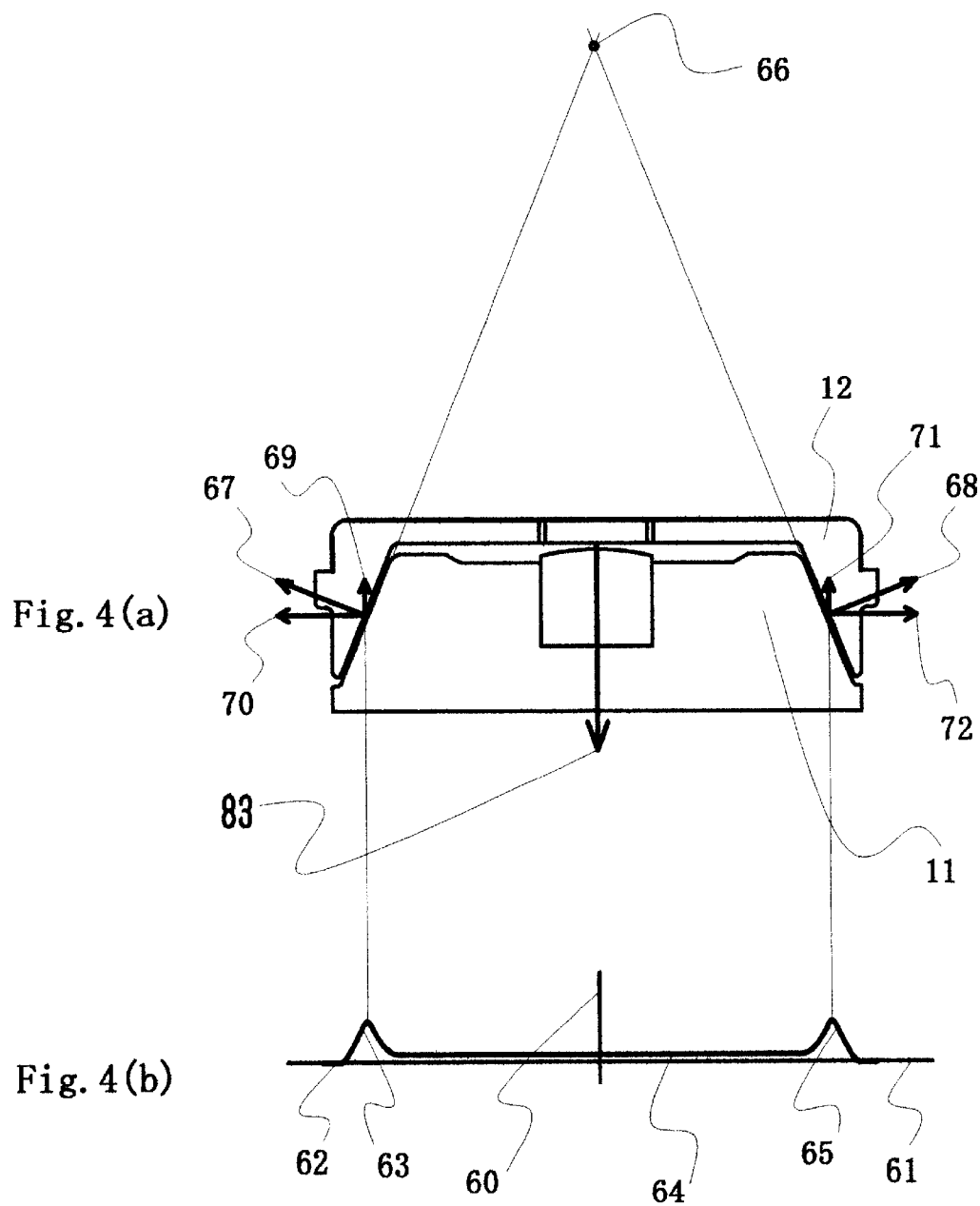

MOTOR HAVING SINGLE CONE AIR DYNAMIC BEARING BALANCED WITH SHAFT END MAGNETIC ATTRACTION

BACKGROUND OF THE INVENTION

1. Technical Field of the Invention

The present invention relates to an air dynamic bearing motor, and more particularly to an air dynamic bearing having a conical shape to enable the motor to be smaller in thickness and lower in cost.

2. Description of the Related Art

There has been a trend toward the fluid dynamic bearing motor as the power source for rotary memory devices, cooling fans, and the like, because of its quietness in operation and the necessity to reduce nonrepeatable runout (NRRO) of rotating parts. Portable applications of such electronic devices have been widespread, increasing the demands for further reduction in their thickness and required current. However, there are limitations on further reduction in thickness of the fluid dynamic bearings, because they need to have a certain span between the bearings for supporting the shaft in order to inhibit NRRO. Also, in order to maintain a constant clearance between the bearings, they must be machined with extreme precision in the order of submicrons, whereby it is difficult to produce them at low cost.

In order to make fluid dynamic bearings thinner, a novel structure is necessary which does not require two bearings for supporting the shaft at axially spaced positions. The bearings should have as little sliding area as possible so as to achieve a reduction in the required current. Further, cost reduction will be achieved through the development of a structure wherein the bearing clearance is maintained with necessary accuracy even with the components machined with a lower degree of precision.

Single cone fluid dynamic bearings, which can support loads of both radial and thrust directions, have attracted attention as having potentialities in many respects. However, while some single cone structures that help decrease the thickness of the bearing have been proposed, for example, in Japanese Laid-open Utility Model Publication No. Hei. 06-004731, these are for air dynamic bearings and anyway have not been very successful. The main reason is that the single cone bearing is structurally incapable of sufficiently inhibiting NRRO during rotation. Japanese Laid-open Patent Publications No. 2000-004557 and No. 2000-205248 propose combined use of a conical bearing and a cylindrical bearing to improve the overall performance. However, the cylindrical bearing requires high-degree machining precision for maintaining a constant bearing clearance, canceling out the advantages of the conical bearing. U.S. Pat. No. 5,854,524 discloses a single semi-spherical air dynamic bearing having a similar structure as that of the single cone bearing, but in this case also, the radius of two spherical surfaces must be strictly controlled to secure a sufficient radial load capacity, because of which cost reduction is hardly achievable.

Thus the problems yet to be resolved in single cone fluid dynamic bearing motors are how to improve the stability in its rotating attitude, and how to realize a structure which is easy to assemble.

SUMMARY OF THE INVENTION

An object of the present invention is to resolve these problems and to provide a single cone air dynamic bearing motor which can be reduced in thickness and required current, and is simple and can be produced at lower cost.

An air dynamic bearing motor according to the invention includes a shaft having a diminishing conical taper surface, a sleeve having a conical concavity opposite the shaft, and means for generating magnetic attraction between one end of the shaft and a cone apex of the sleeve. In this construction, a plurality of grooves are formed on a conical taper surface of one of the shaft and the sleeve, and the grooves are provided for creating load capacity when the motor rotates, whereby rotating parts of the motor are supported by axial components of the load capacity balanced with the magnetic attraction.

The means for generating magnetic attraction includes a permanent magnet and a magnetic material, respectively provided inside the shaft and in the apex of the sleeve opposite to the shaft, or vice versa. Magnetic attraction developed at the end of the shaft acts on the shaft to adjust its position in cooperation with the load capacity created by the grooves, thereby ensuring the stable attitude of rotating parts.

A ring-shaped member is fixed to one end of the sleeve, and an annular recess is provided in the fixed member, the free edge of the ring-shaped member being positioned within the annular recess, so as to restrict an axial movable distance of the rotating parts. This structure serves as a stopper for the rotating parts in the case where the motor is subjected to a large shock.

Moreover, the following structures for a permanent magnet to protrude from one end of the shaft are proposed. The shaft includes the permanent magnet held inside. The permanent magnet is assembled with the shaft such that it is initially held movably but firmly enough to overcome the magnetic attraction as being substantially protruded from one end of the shaft, and is pressed into the shaft by a pressure larger than the magnetic attraction applied from both ends of the shaft and the sleeve to a predetermined position, where the cone apex of the sleeve or a plate spring interposed between the apex of the sleeve and the permanent magnet is resiliently deformed, whereby when the motor is stationary the permanent magnet and the apex of the sleeve or the plate spring make contact with each other, while they are brought out of contact when the motor is rotating, by a distance equal to or shorter than an axial flying height determined on conical surfaces of the shaft and sleeve. Thereby, the start-up failure caused by the conical surface of the shaft being fitted in the sleeve when the motor is not in operation can be avoided, improving the reliability of the motor.

Alternatively, the grooves may be formed on both opposite taper surfaces of the shaft and the sleeve at the almost same axial positions. In this constitution, the grooves have different angular length from each other in the circumferential direction. Thereby, each delay, from the time point when the bearing clearance becomes small until the time point when the pressure in the air in the clearance becomes local maximum by the corresponding groove, is varied in proportion to the corresponding angular length of each of the grooves. Thereby, an improved constitution which can avoid half whirls and other unstable movements of the motor can be provided.

According to the air dynamic bearing motor of the present invention, the load capacity created by the rotation of the motor acts vertically with respect to the conical surfaces, causing the shaft and the sleeve to rotate in non-contact relationship at a position where the axial components of the load capacity and the magnetic attraction are in equilibrium. The radial components of the load capacity counterbalance each other at respective circumferential points, thereby contributing to the centering of the rotating parts. The load capacity itself acts vertically on the tapered surface of the cone, and therefore it serves to adjust the attitude of rotating parts when they tilt with respect to the fulcrum conforming to the cone apex. Magnetic attraction developed at the end of the shaft acts on the shaft to adjust its position in cooperation with the load capacity created by the grooves, thereby ensuring the stable attitude of rotating parts.

The main reason why the prior art single cone bearing has failed to maintain the attitude of rotating parts is that the bearing was provided only with a load equal to the weight of its own, or even less than that by using a magnetic bearing in order to avoid friction during the initial and final periods of operation as disclosed in Japanese Laid-open Utility Model Publication No. Hei. 06-004731. As has been explained above, a good balance is achieved between two forces of the axial component of load capacity of the bearing versus the load. Therefore, a small load can only create a small load capacity, which is insufficient to create forces for maintaining stable attitude of rotating parts. In the air dynamic bearing of the present invention, a large load is applied on the bearing by the magnetic attraction acted between the shaft and the sleeve. Therefore, the load capacity of the bearing, which counterbalances the load, can be set to a desired large value, whereby the stability of the attitude of rotating parts is improved. The magnetic attraction may be varied case by case depending on permissible level of NRRO, the size of the motor, and various other conditions.

BRIEF DESCRIPTION OF THE DRAWINGS

These and other objects and advantages of the present invention will become clear from the following description with reference to the accompanying drawings, wherein:

FIG. 4(a) illustrates a cross-section of the shaft and the sleeve, and component forces of load capacity, and FIG. 4(b) illustrates the distribution of pressure developed during the rotation;

DESCRIPTION OF THE PREFERRED EMBODIMENT

Preferred embodiments of an air dynamic bearing motor according to the present invention will be hereinafter described with reference to the accompanying drawings.

Figure 1:
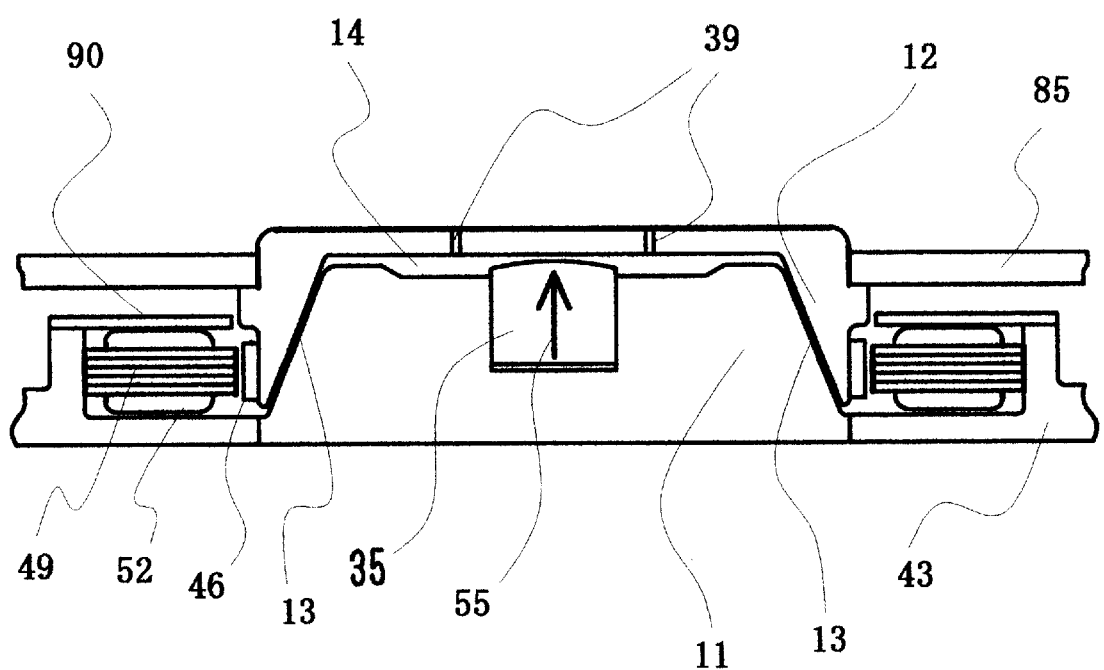
FIG. 1 is a cross sectional view showing an air dynamic bearing motor according to a embodiment of the present invention.

FIG. 1 is a cross sectional view of a fluid dynamic bearing motor according to a embodiment of the present invention. A shaft 11 has a diminishing conical taper, and a sleeve 12 arranged opposite the shaft 11 has a conical concavity. A permanent magnet 35 is provided within the shaft 11, so as to generate magnetic attraction between itself and the top of the sleeve 12 which is made of a magnetic material.

Reference numeral 39 illustrates breathing holes which leak compressed air from the top 14 of the cone. The size of channel 39 are enough small to adjust the flow resistance such that pressure remains at the top 14 of the cone, whereby the sleeve 12 can fly up swiftly at the time of start-up. Reference numeral 90 represents magneteic material which act as magnetic shield. Rotary section is composed of the sleeve 12, a rotor magnet 46, and a magnet disk 85, and fixed section is composed of the shaft 11, a base 43, a stator core 49, coils 52, and others.

The bearing section is constituted by the shaft 11, the sleeve 12, and a series of herringbone grooves, to be described later, provided in one of the conical taper surfaces 13 of the shaft 11 and the sleeve 12. The grooves serve to pump the air toward their center to increase the pressure of the air. The load capacity thereby created is in inverse proportion to the size of the clearance between the shaft 11 and sleeve 12. Therefore, the clearance size is determined such that the axial components of the load capacity and the above-mentioned magnetic attraction are in equilibrium, while radial components of the load capacity are used for the centering of the sleeve 12. Accordingly, the magnetic attraction, which determines the load capacity, is set so that the load capacity is large enough to support the rotary section during rotation. The clearance, accordingly, is approximately several micrometers wide. When the apical conical angle of the bearing section is large, the axial components of the load capacity may be given more consideration, while the radial components play a more important role when the apical conical angle is small. In this embodiment, the angle of the cone apex is slightly smaller than 60° so as to give more weight to the radial components to ensure precise centering of the sleeve.

The stator core 49 and the coils 52 cooperate with the rotor magnet 46 to drive the rotary section. The rotary section further includes a magnetic or optical disk or the like carried thereon as a load. The force applied to the interface between the shaft 11 and the sleeve 12 varies depending on the manner in which the memory device is installed in a normal state or inverted state. That is, if the device is set in a normal state, the bearing receives the weight of the movable parts in addition to the magnetic attraction. If the device is set in an inverted state, the bearing receives a load less than the magnetic attraction because the weight of the movable parts is subtracted therefrom. In light of this, the magnetic attraction should be approximately three times larger than the weight of the movable parts, which has empirically been confirmed to ensure stable rotating attitude of the rotary section. If the magnetic attraction is increased so as to create accordingly larger load capacity, precession of the shaft can further be restricted and its attitude can be made more stable. On the other hand, it has been ascertained that such increase in the magnetic attraction causes the sliding friction to become larger at the time of starting up or stopping the motor, resulting in shorter operable life of the bearing. Therefore, in the case of the air dynamic bearing motor for a small magnetic disk device, magnetic attraction should be approximately five times larger than the weight of the movable parts, which is the sum of the weight of the rotary section and the load weight. Such settings may be determined case by case depending on the required precision for the rotating attitude of rotary section.

Figure 2:
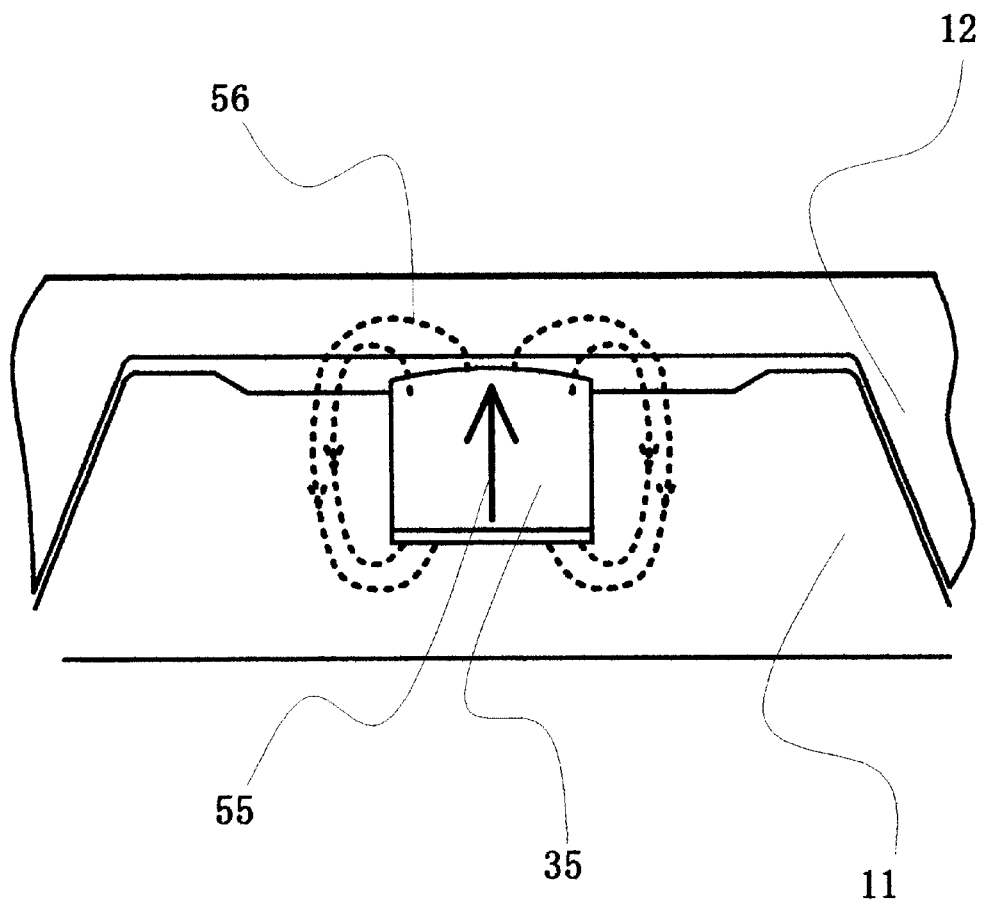
FIG. 2 illustrates the means for generating magnetic attraction and the lines of magnetic flux in the embodiment shown in FIG. 1.

FIG. 2 illustrates a cross-section of the shaft 11, permanent magnet 35, sleeve 12 and others, together with lines of magnetic flux. The shaft 11 is made of a non-magnetic material while having the permanent magnet 35 inside, which is made of highly magnetic rare earth. Provided that the bearing section has about 20 mm diameter, the design value allotted to the diameter of the permanent magnet 35 is up to 15 mm. Since the top of the shaft 11 and the sleeve 12 are arranged with a very small clearance of about 20 micrometers therebetween, magnetic attraction remains constant irrespective of the variations in this clearance. Thus the tolerance in machining and assembling can be set larger. Reference numeral 55 indicates the direction of magnetization of the permanent magnet 35. The distal end of the permanent magnet 35 is formed spherical so as to concentrate the magnetic flux. The magnetic flux 56 thus intensified enters the truncated cone top end of the sleeve 12, it passes through the sleeve 12 and returns to the other end of the permanent magnet 35. The magnetic flux returning to the end of the permanent magnet 35 flies a long distance and over a large area and thus is distributed and low in intensity.

Apart from the structure shown in FIG. 2, magnetic attraction could be developed using the rotor magnet 46 and the stator 49 axially offset from each other, or the rotor magnet 46 and the magnetic piece arranged below the rotor magnet. However, the former has a disadvantage that it produces vibration, and the latter causes an increase in consumed current because of the Foucault current developed in the magnetic piece. The magnetic attraction generating means in this embodiment can resolve all these problems encountered by the above-mentioned other mechanisms.

Figure 3A:
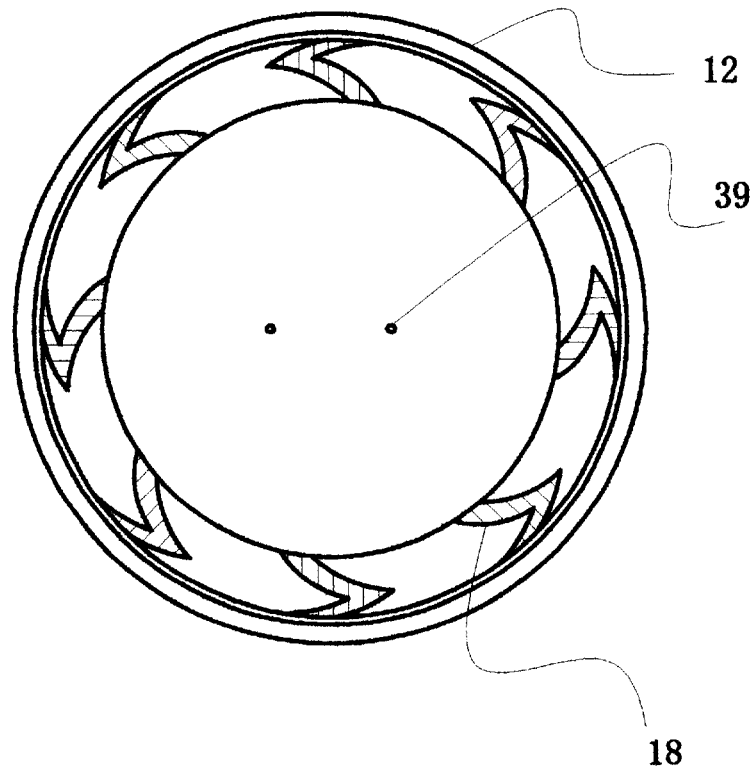
FIG. 3(a) and FIG. 3(b) illustrate the bearing section in detail, FIG. 3(a) being a plan view of a sleeve, and FIG. 3(b) being a cross sectional view of a shaft and the sleeve.
Figure 3B:
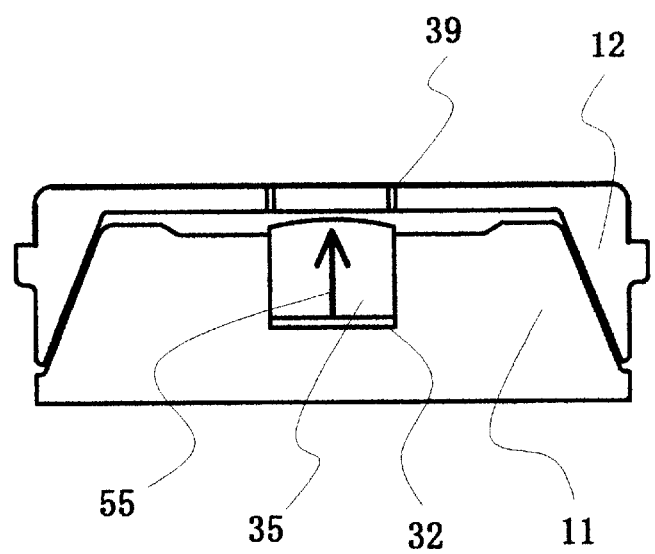

FIG. 3(a) and FIG. 3(b) illustrate the structure of the bearing section of the embodiment shown in FIG. 1 in more detail. FIG. 3(a) is a plan view of the sleeve 12, and FIG. 3(b) is a cross sectional view of the shaft 11 and the sleeve 12. As shown in FIG. 3(a), a series of herringbone grooves 18 is provided on the taper surface 13 of the sleeve 12. The grooves 18 are V-shaped shallow recesses of about several micrometers depth. When the motor rotates, the grooves 18 pump the air from the outer and inner peripheral sides toward their central pointed ends to increase the pressure of the air, so as to lift the sleeve 12 from the shaft 11 and support it in a flying state. In this embodiment, the grooves are formed so that the pumping capacity from the outer peripheral side toward the inner peripheral side is larger than that from the inner peripheral side toward the outer peripheral side, whereby the pumping capacity towards the inner peripheral side remains and the pressure of the air on the inner peripheral side can be increased swiftly when starting up the motor, so as to decrease the sliding friction between the shaft 11 and the sleeve 12. The grooves 18 illustrated in FIG. 3(a) have larger groove length on the inner peripheral side, but this does not contradict the description in the foregoing, since the pumping capacity is determined by the diminishing degree of the circumferential length of the grooves and the radial length of the grooves.

FIG. 4(a) and FIG. 4(b) illustrate the distribution of pressure developed in the air when the motor rotates and the component forces of the load capacity applied to the interface between the shaft 11 and the sleeve 12 in accordance with the pressure distribution. These drawings are given in explanation of how the rotating attitude of the sleeve is self-adjusted.

FIG. 4(b) shows various features 62, 63, 64, and 65 of the pressure distribution of the air caused by the grooves 18 in operation. The y-axis 60 represents pressure, while the x-axis 61 indicates radial coordinates corresponding to FIG. 4(a). The pressure reaches a highest point 63, 65 at positions substantially corresponding to the pointed ends of the V-shaped grooves 18. The drawing shows the pressure distribution without the influence of the atmospheric pressure, and therefore the pressure 62 at an outer peripheral point is almost zero. On the other hand, the pressure 64 at an inner peripheral point is higher than the atmospheric pressure, because the grooves 18 are formed to have larger pumping capacity towards the inner peripheral side.

FIG. 4(a) shows a cross-section of the shaft 11 and the sleeve 12. Reference numerals 67, 68 represent the load capacity created as the pressure in the air increases. It should be noted that such a load capacity is created at each one of the several circumferentially located points, but only two of these are shown in a cross-section for the ease of explanation.

Reference numerals 69, 71 represent the axial components of the load capacity 67, 68, respectively. Reference numerals 70, 72 represent respective radial components thereof. Since the load capacity 67, 68 is substantially in inverse proportion to the size of the clearance between the shaft 11 and the sleeve 12, the clearance is determined such that the axial components 69, 71 and the magnetic attraction between the rotary section and the fixed section are in equilibrium. The radial components 70, 72 act in opposite directions so that they counterbalance each other, whereby the sleeve 12 is centered.

The load capacity 67, 68 acts vertically to the conical surfaces. Thus, it acts on the sleeve 12 as moment, i.e., the distance L multiplied by the load capacity 67, 68, where L is the distance from an imaginary fulcrum 66 corresponding to the cone apex and the point from which the load capacity 67, 68 acts. The moment resulting from the load capacity 67, 68 acts in reverse directions, and because the load capacity 67, 68 is substantially in inverse proportion to the nearby clearance between the shaft 11 and the sleeve 12, the moment caused by the load capacity 67, 68 acts around the fulcrum 66 as a position adjusting force for the sleeve 12, counterbalancing each other to equalize the clearance between the shaft 11 and the sleeve 12. Thereby, the attitude of the sleeve 12 is maintained upright, and its precession is restricted.

It will be understood from FIG. 4(a) that the magnetic attraction 83 acting from the top end of the shaft 11 serves as the moment to adjust the rotating attitude jointly with the load capacity 67, 68. Thus the structure in which one end of the shaft has magnetic attraction can more advantageously help maintain the stable attitude of rotary section.

Furthermore, the motor according to the invention is low in respect of bearing loss. Bearing loss of the air dynamic bearing is mainly caused by friction between the surfaces of the shaft 11 and sleeve 12 and the air in small clearances where the grooves exist. The bearing according to the invention has only a series of grooves, which is a practical minimum, and thereby can achieve a reduction in required current.

The moment which acts on the sleeve 12 to maintain its attitude is defined by the product which is obtained by multiplying the distance L by the load capacity 67, 68 as noted above. Therefore, there is no need to provide two series of grooves with a large span therebetween in an axial direction as in the prior art. The motor according to the invention needs only one series of grooves 18, therefore the structure is more simple and thinner than the prior art.

For the material of the bearing components such as shaft and sleeve, any of the materials such as ceramics stainless steel or copper alloy which have commonly been used for the fluid dynamic bearing can be used. Preferably, a thin film of nickel, titanium, diamond-like-carbon, or molybdenum disulfide should be formed on one of the conical taper surfaces, so as to decrease the friction at the time of starting up and stopping the motor.

Regarding the manufacturing method of the bearing components, not to mention the shaft having a convex shape, the sleeve, although having a concave shape, it can be easily released, because its tapered top is opened. Therefore they both can be formed at one time including the grooves, by any known techniques such as press molding or injection molding. Accordingly, the bearing components can also be made of a ceramics or sintered alloy by molding, or of a resin material having superior antifriction properties such as polyphenyl sulfide resin (PPS) containing carbon fiber by molding, whereby a reduction in production cost is achieved.

Figure 5:
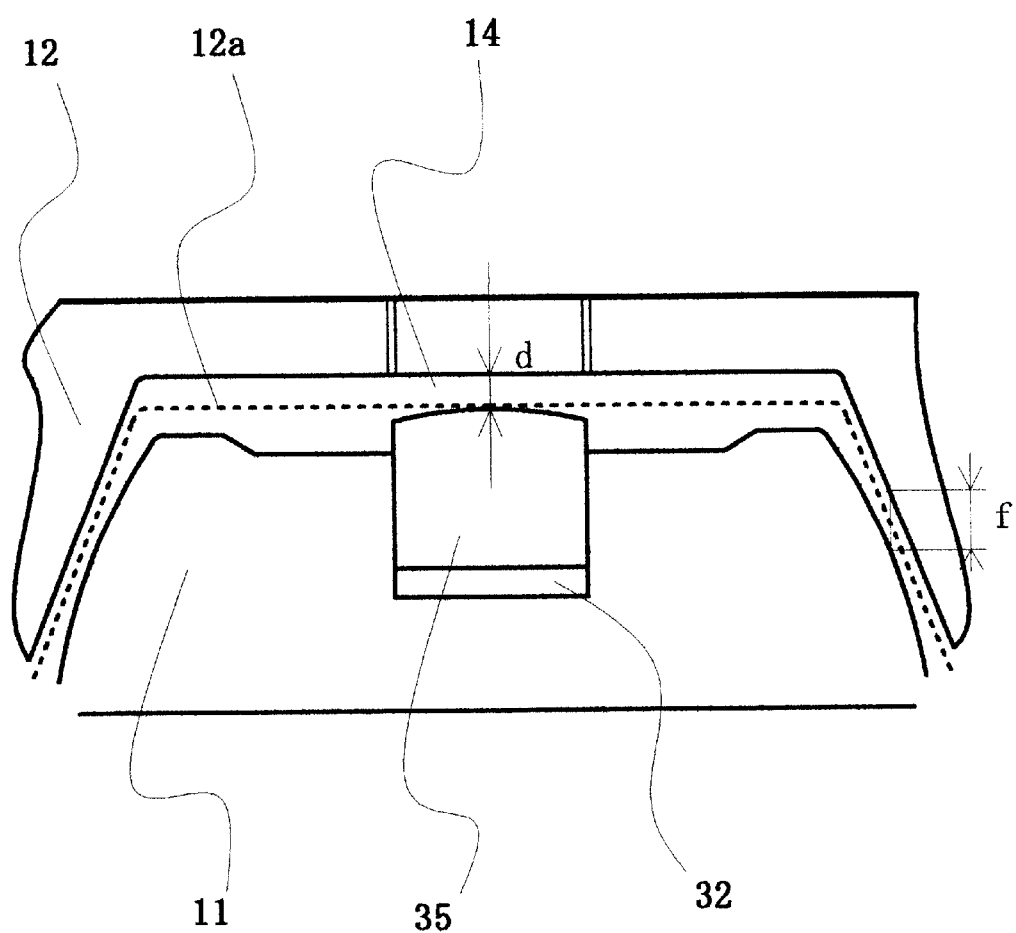
FIG. 5 is a detailed cross sectional view of the bearing section having a permanent magnet at one end of the shaft for limiting contact between the shaft and the sleeve when they are stationary.
Figure 6:
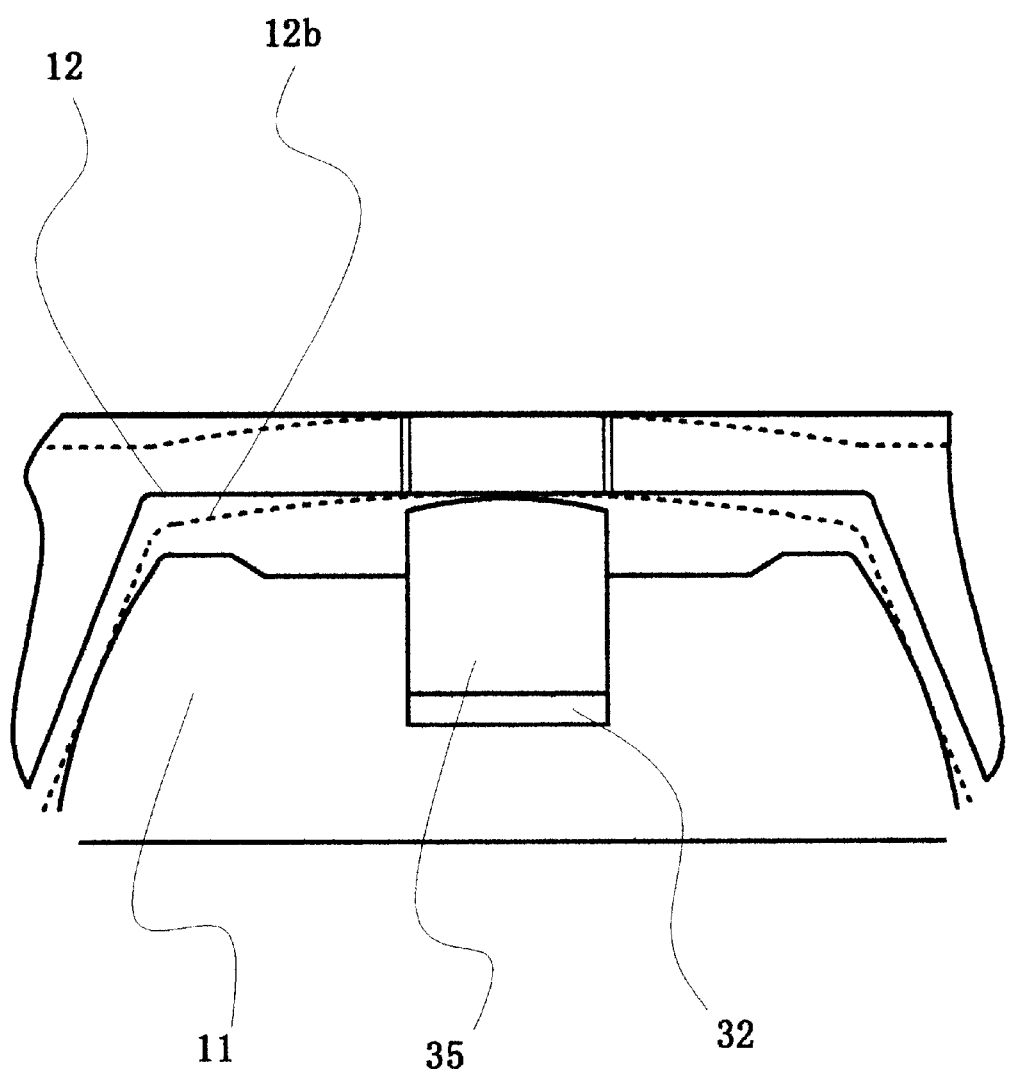
FIG. 6 is an explanatory view illustrating how the permanent magnet of FIG. 5 is fitted in a predetermined position.

FIG. 5 and FIG. 6 are detailed views of the bearing section illustrating how the permanent magnet prevents the shaft and the sleeve from making surface contact with each other when they are stationary. As shown in FIG. 5, the permanent magnet 35 is provided at the top end of the shaft 11, such as to contact the inside top limit of the conical sleeve 12 when stationary. The dotted lines 12*a* illustrate the position of the sleeve when stationary, while the solid lines indicate the position of the sleeve 12 when rotating. The permanent magnet 35 protrudes by a predetermined amount such that f≧d, where d is the distance between the top of the permanent magnet 35 and the inside top limit of the sleeve 12, and f is the axial flying height of the sleeve 12 from the shaft 11 measured at conical surfaces. To be specific, the permanent magnet 35 is protruded so that f–d is about 5 micrometers if the flying height is around 10 micrometers. Thus the top of the sleeve 12 flies up from the permanent magnet 35 at least about 5 micrometers during rotation, while its conical surface flies up to an axial height of about 10 micrometers, maintaining a stable rotating attitude.

Conical bearings have a potential risk that the shaft fits into the sleeve, increasing the friction therebetween, resulting in start-up failure. This is caused by various factors such as the intensity of magnetic attraction, the apical conical angles, and the hardness of the material making up the shaft and sleeve, correlating with each other. Small motors to which the present invention is applied are relatively free of such troubles, but the structure shown in FIG. 5 further ensures that no such troubles will occur.

FIG. 6 is given in explanation of how the permanent magnet shown in FIG. 5 is adjusted in position. The permanent magnet 35 is initially fitted in the cylinder 32 inside the shaft 11 with clearance so as to be movable, but firmly enough to overcome the magnetic attraction. For assembling the permanent magnet 35, it is placed upon the shaft 11 as being protruded substantially therefrom, and the sleeve 12 is coupled thereon. Pressure that is larger than the magnetic attraction is then applied to the sleeve 12 and the shaft 11 so that the permanent magnet 35 contacts the inside top limit of the sleeve 12, until the shaft 11 and the sleeve 12 make surface contact with each other on their conical surfaces and the truncated cone apex of the sleeve 12 is resiliently deformed. The dotted lines 12*b* indicate the deformed sleeve under pressure, while the solid lines indicate the sleeve 12 having restored to have its initial truncated conical apex, after the pressure has been removed. As the sleeve 12 resiliently returns into its initial shape, a clearance is created between the conical surfaces of the shaft 11 and the sleeve 12. A plate spring may be arranged on the inside top limit of the sleeve 12 instead of utilizing the resilient deformation of the top of the sleeve.

After the position alignment, the permanent magnet 35 should preferably be fixed in position by bonding or welding, so as to withstand large shocks. Further, it is preferable to provide antifriction measures on the top of the permanent magnet 35 and the opposite inside top limit of the sleeve 12 such as application of a ceramic material or plating treatment, so as to ensure stable performance over a long time.

Single cone bearings have the characteristics that even when the shaft and the sleeve have slightly different diameters, they still can face each other at given axial positions, whereby the tolerance of their dimensions can be made large, offering the advantage of lower cost. The permanent magnet 35 shown in FIG. 5 could initially be fixed to the shaft 11, but in that case the diameters of the shaft 11 and the sleeve 12 and the protruding amount of the permanent magnet 35 must precisely be controlled. If the demands for the performance of the fluid dynamic bearing motor in regard to inhibition of NRRO are relatively low, then such control of dimensions could easily be achieved, while it is not if the demands are high. Thus the total cost would be lower with the structure wherein the permanent magnet allows itself to be positionally adjusted as in this embodiment.

Figure 7:
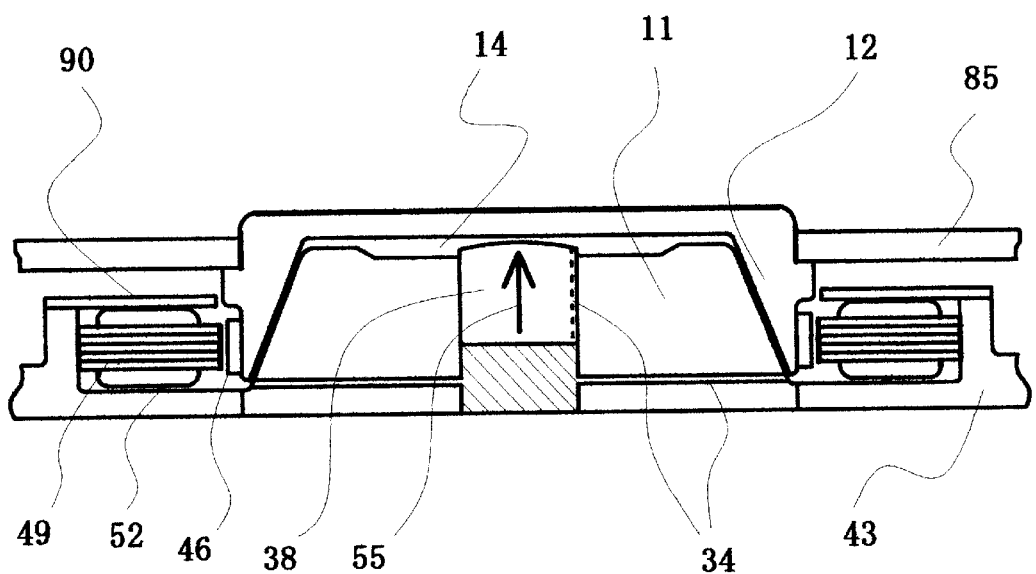
FIG. 7 is a cross sectional view of a modified construction of the embodiment in which a channel is formed through the shaft.

FIG. 7 shows another modified construction of the embodiment having a channel 34 that runs through the shaft 11 from its truncated cone top 14 to the outer periphery thereof. The channel 34 is provided for circulating the air compressed towards the top 14 of the shaft 11 to the outside of the cone. The channel 34 is filled with fibrous or porous material to adjust the flow resistance such that pressure remains at the top 14 of the cone, whereby the sleeve 12 can fly up swiftly at the time of start-up, and whereby shock-absorbing effects are achieved because of the compressed air that escapes and adjusts the damping level. Moreover, galls produced on the sliding parts can be removed with the structure of this example.

Also the channel 34 can run through to the outside of the motor via filtration material such as fibrous or porous material. The reference numeral 38 shows the permanent magnet with a small groove at the side.

Figure 8A:
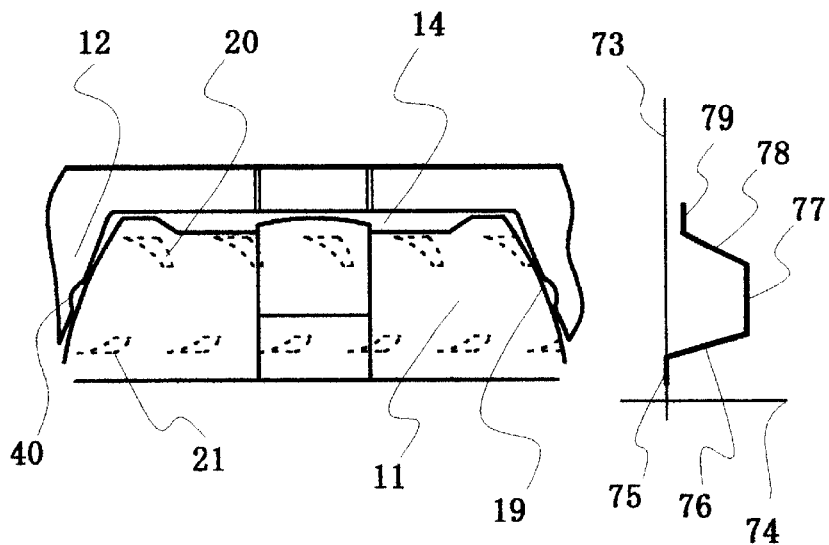
FIG. 8(a) illustrates a cross-section of the bearing section having a crown, with a graph showing the pressure distribution.

FIG. 8 shows a modified embodiment in which has herringbone grooves and crown in the conical surface. The herringbone grooves in the conical surface are formed to have flat region in central parts as shown in FIG. 8(a). While the grooves 20, 21 on both sides of the crown are shown in the cross sectional view so that their positions are more clearly understood, they are actually formed on the surface of the conical shaft 11, having a several micrometers depth. The shaft 11 has a slightly bulging crown 19 on its conical surface so as to have a flat band region where the bearing clearance is minimum. Correspondingly, a circumferential groove 40 of about 10 micrometers depth is provided in the sleeve 12 opposite the flat band region formed by the crown 19. Specific dimensions of the crown 19 may differ case by case depending on various conditions, but basically they are set such that the bearing clearance at the outermost periphery of the conical shaft 11 and the sleeve 12 is several micrometers larger than that in the flat band region. With this construction, even if the apical conical angles of the shaft 11 and the sleeve 12 are not precisely in conformity with each other, edge contacts at the inner and outer peripheries can be prevented. Therefore, the machining tolerance of the components can be made larger.

The herringbone grooves are made up of two types of spiral grooves for pumping in and pumping out purposes. In other words, pumping-out spiral grooves 20 are positioned on the inner peripheral side, while pumping-in spiral grooves 21 are arranged on the outer peripheral side, with the crown 19 for making the bearing clearance minimum positioned therebetween. The number of grooves per one round, the inclination angle of the grooves, and other features of the grooves can suitably be set according to their purposes.

FIG. 8(a) shows the pressure distribution observed during the operation of the bearing having the above-described grooves. The y-axis 73 indicates axial coordinates, while the x-axis 74 represents pressure. Reference numerals 75, 76, 77, 78, and 79 represent mean pressure values in a circumferential direction at respective axial positions. The drawing shows the pressure distribution without the influence of the atmospheric pressure, and therefore the pressure 75 at an outer peripheral point is zero. The pressure increases as denoted by the reference numeral 76 because of the grooves 21, and becomes constant in the central region as indicated by the reference numeral 77. The pressure decreases at a position where the grooves 20 are formed as indicated by the reference numeral 78. At the top 14 of the cone, the pressure is slightly higher than the atmospheric pressure as indicated by the reference numeral 79.

Figure 8B:
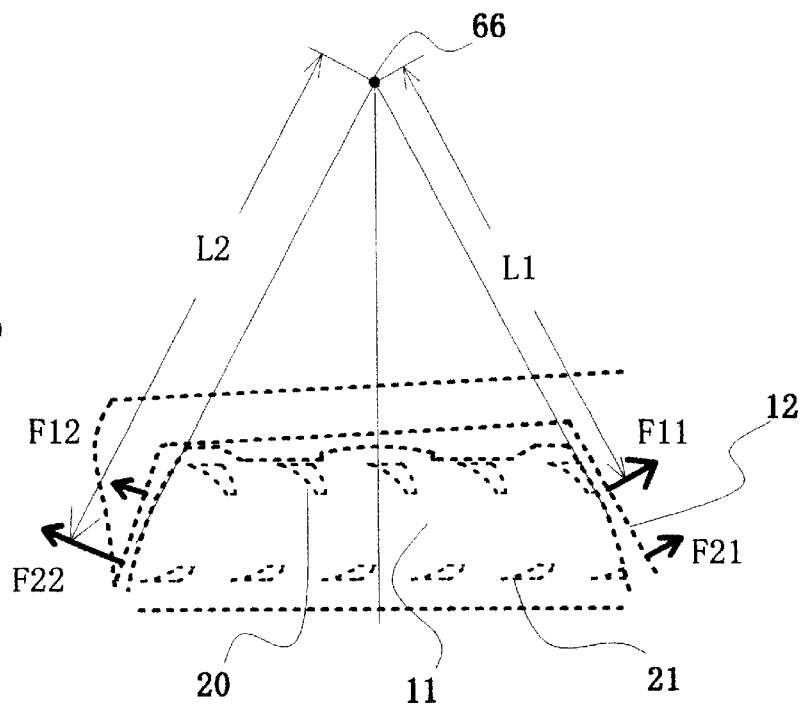
FIG. 8(b) illustrates how the load capacity acts on the rotary section when it is offset from the center.

The attitude of the rotary section is basically maintained by the high pressure 77 in the central region. A more specific account of the position adjusting mechanism will be given below with reference to FIG. 8(b). The pressure values 75, 76, 77, 78, and 79 in the pressure distribution of FIG. 8(a) are mean values in circumferential directions and they may locally vary if the sleeve 12 comes off-center or tilts with respect to the shaft 11. FIG. 8(b) illustrates a state wherein the sleeve 12 is rotating as being inclined leftward at the upper part thereof and rightward at the lower part thereof with respect to the shaft 11. The load capacity, created by the grooves 20 in the central region where the clearance is made small by the crown 19, becomes uneven in the circumferential direction, i.e., the load capacity F11 on the right side becomes larger than the load capacity F12 on the left side because the bearing clearance is smaller on the right side. Similarly, the pressure developed by the grooves 21 becomes uneven, the load capacity F21 on the right side being smaller than the load capacity F22 on the left side. Here, the load capacity acts on the upper part of the sleeve 12 as moment of L1*(F11−F12), while it acts on the lower part of the sleeve 12 as moment of L2*(F21−F22), where L1, L2 are the distances from an imaginary fulcrum 66 corresponding to the cone apex and the respective points from which the load capacity F11, F12, F21, F22 acts. The moment acts around the fulcrum 66 as a force to make the bearing clearance at respective points equal. It should be noted that the description given above is simplified and the moment actually counterbalances each other at all circumferential and axial points, not only on the left and right sides.

In this way, by arranging a series of herringbone grooves on the conical surface with a small clearance region therebetween, a moment force is generated that acts on the rotary section to equalize the upper and lower clearances between the shaft 11 and the sleeve 12, thereby adjusting the rotating attitude of the rotary section. Thus the precession is further restricted in the air dynamic bearing motor of this embodiment. When the sleeve 12 comes off center with respect to the shaft 11, the pressure in the lubricant locally increase because of the wedge effect in the intermediate small-clearance band region formed by the crown 19. A delay from the time when the bearing clearance is reduced until the time when a large pressure is developed may induce half whirls or other unstable movements of the rotary section. This is why the circumferential groove 40 is provided, as it distributes the locally collected lubricant in circumferential directions, thereby enhancing the position adjusting effect by the grooves and preventing half whirls.

Figure 9A:
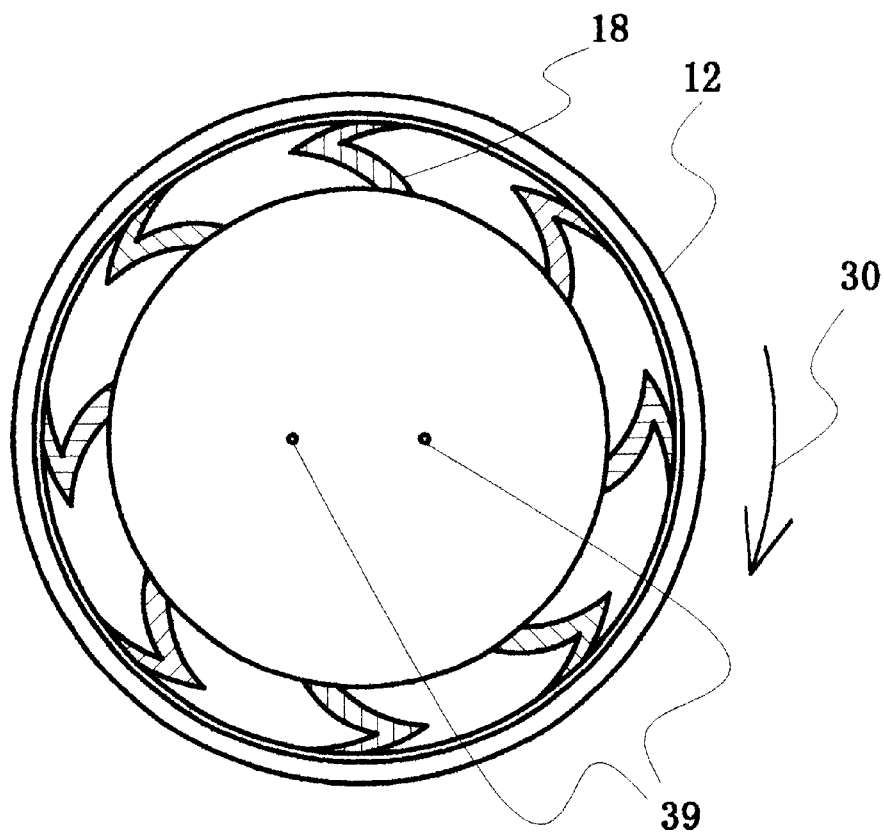
FIG. 9(a) and FIG. 9(b) are detailed views of the bearing section having a modified construction wherein grooves are formed on both opposite surfaces of the shaft and the sleeve, FIG. 9(a) being a plan view of the sleeve, and FIG. 9(b) being a cross sectional view of the shaft and the sleeve.
Figure 9B:
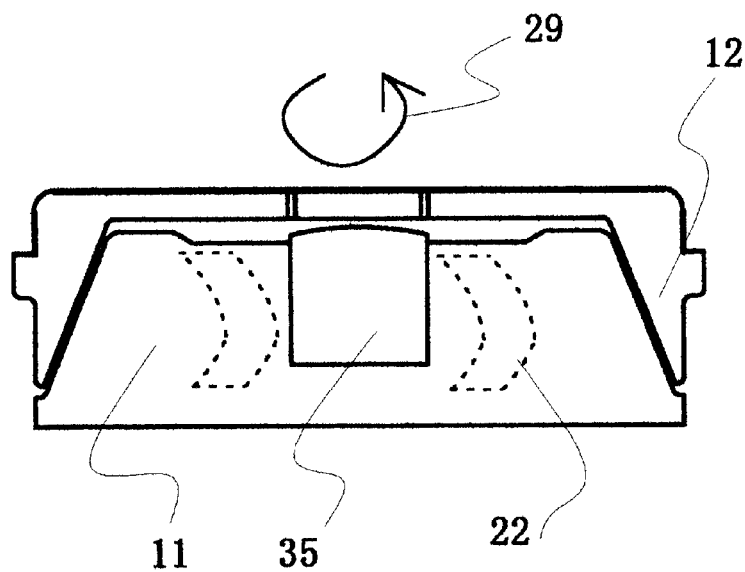

FIG. 9(a) and FIG. 9(b) show the vicinity of the bearing section according to a further modified construction of the embodiment in which grooves are formed on both opposite surfaces of the bearing section. FIG. 9(a) shows a bearing surface of the sleeve 12 in a plan view. As shown, the sleeve 12 has on its bearing surface a plurality of herringbone grooves 18. FIG. 9(b) is a cross-section of the shaft and the sleeve. The shaft 11 has a permanent magnet 35 inside for generating magnetic attraction. On its outer surface, a series of herringbone grooves 22 is formed. The grooves 18 and 22 have a depth of about several micrometers, and grooves 22 on the surface of the shaft 11 and those 18 on the sleeve 12 have different angular lengths in the circumferential direction. In the specific example given in these drawings, the grooves 18 on the surface of the sleeve 12 have angular lengths of more than twice as large as that of the grooves 22 on the shaft 11 in the circumferential direction. The arrows 29, 30 indicate the direction in which the sleeve 12 rotates.

Grooves pump the air when the bearing rotates to increase the pressure in the air. The increased pressure, which is substantially in inverse proportion to the bearing clearance, causes a force to act on the rotary section to adjust its rotating attitude. Since the grooves are arranged at circumferentially spaced positions, even if the sleeve comes off-center with respect to the shaft and the bearing clearance becomes locally small, there is a delay until the balance in the circumferential pressure distribution is disturbed. This delay or time lag is in proportion to the angular length of the grooves in the circumferential direction. It is known that control systems with the time lag between the change in the controlled variable and the control over the change are susceptible to a resonant phenomenon, which, in the case of the air dynamic bearing, takes the form of precession, half whirl or other unstable movements.

In order to avoid such unstable movements, for example, the circumferential length of the grooves 18 may be varied so that the time lag is varied. However, if the angular lengths of only several grooves in one round are changed, the possibility of the position adjusting force not acting evenly increases, or other problem may arise. Therefore, in this embodiment, the grooves on the shaft 11 and those on the sleeve 12 are varied in their angular lengths in the circumferential direction so as to both achieve the circumferential evenness in the position adjusting force which is created by the increased pressure in air, and the variety in the angular length of the grooves in the circumferential direction. Machining of the grooves is generally not easy and forming them on both bearing surfaces may lead to an increase in cost. However, the conical shaft 11 and the sleeve 12 in this embodiment can both be produced by molding, and therefore such grooves can be provided without increasing cost. Thus an air dynamic bearing motor with limited precession is realized.

Figure 10A:
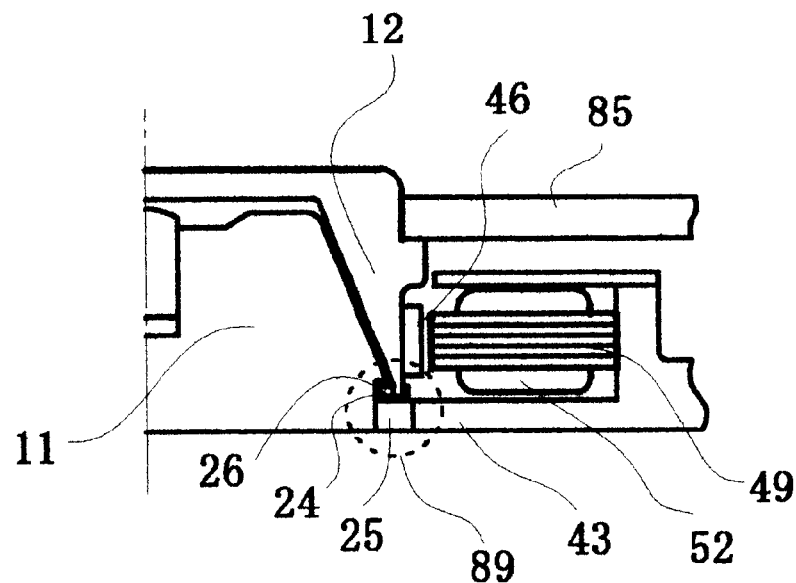
FIG. 10(a) and FIG. 10(b) are explanatory views illustrating how a ring-shaped member can be axially adjusted, FIG. 10(a) being a cross sectional view of the bearing section, and FIG. 10(b) being an enlarged cross sectional view of the vicinity of the ring-shaped member.
Figure 10B:
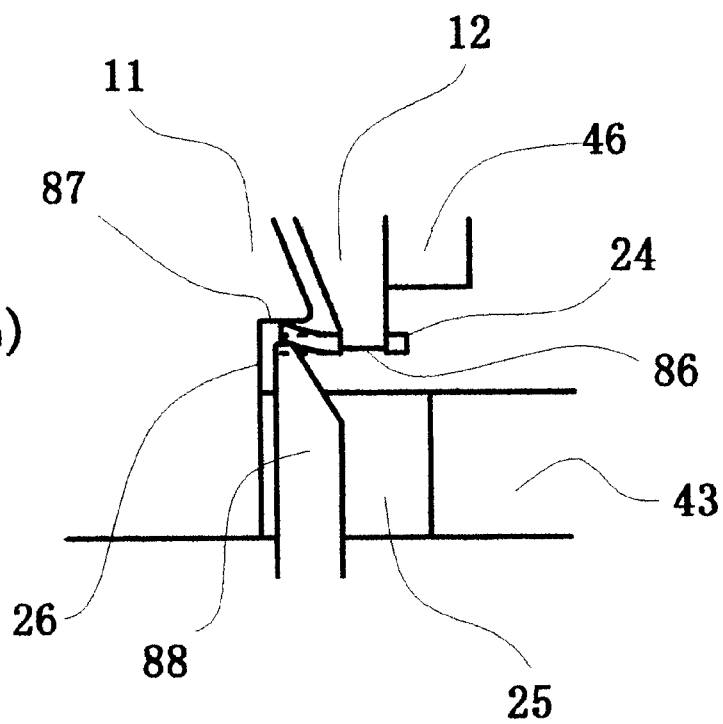

FIG. 10(*a*) and FIG. 10(*b*) illustrate a modified construction of the embodiment wherein the ring-shaped member can be adjusted in axial directions. FIG. 10(*a*) is a cross sectional view of the bearing section, and FIG. 10(*b*) is an enlarged cross sectional view of part 89 of the ring-shaped member and other components. In this example, the sleeve 12 has a protrusion 86 on its end, while the ring-shaped member 24 has a corresponding through hole to match this protrusion. The ring-shaped member 24 is preliminarily coupled into the annular recess 26 around the shaft 12 and assembled to the sleeve 12. Access holes 25 are provided, through which the protrusion 86 and the through hole of the ring-shaped member 24 are engaged with each other. Then, using a jig 88, the inner periphery of the ring-shaped member 24 is abutted onto the end face 87 of the annular recess 26. The ring-shaped member is thus coupled to the protrusion 86 as being resiliently deformed.

In this assembling process, the ring-shaped member 24 is resiliently deformed in an axial direction by about 20 micrometers, while being coupled to the protrusion 86 firmly. Thereby, axial displacement of the rotary section is restricted to be about 20 micrometers even if it is subjected to large shocks. In the case of hard disk drives, there is a strong demand for restricting axial displacement of the magnetic disk to a minimum. By utilizing resilient deformation of the ring-shaped member 24 as in this embodiment, such requirements can be met without higher demands for the tolerance of various components. Alternatively, the ring-shaped member 24 and the protrusion 86 may be joined after the assembly by bonding or welding to have a higher strength to withstand large impacts.

Figure 11:
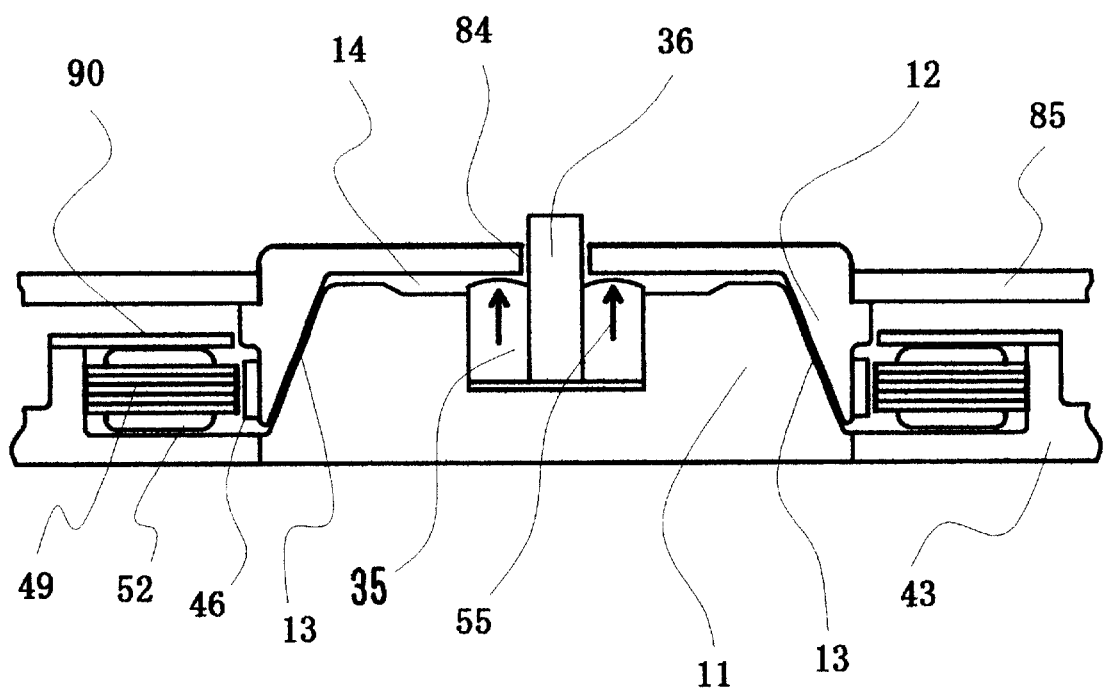
FIG. 11 is a cross sectional view of a modified construction of the embodiment in which both ends of the shaft are fixed.

FIG. 11 illustrate another modified construction of the embodiment wherein both ends of shaft are fixed. In this embodiment, a small diameter shaft 36 is fixed at the center of the permanent magnet 35 and is protuded through the center hole 84 of the sleeve 12. Other features are the same with the embodiment shown in FIG. 1, so the explanation about them is not repeated. In case of a thinner device, such small diameter shaft 36 can support the upper wall of the case.

Although the embodiments shown in above have been described as having the sleeve 12 and the hub formed in one piece, they may be separate components and assembled together. Whether they should be produced in one piece or separately may be determined case by case so that the cost is lower, taking into consideration the characteristics and specifications required for each component. In the application of the invention to a hard disk drive as has been shown in these embodiments, however, there are stringent specifications with regard to the height and tilt of the install surface of the magnetic disk. Since these are strongly affected by their positional relationship with the bearing surface, it is more preferable to form the sleeve 12 and the hub in one piece to achieve higher precision. The air dynamic bearing motor according to the present invention enables the integral structure of the sleeve and the hub and realizes a high-precision, low-cost motor.

According to an air dynamic bearing motor of the present invention, the bearing section has a simple structure wherein grooves are formed on a conical taper surface for increasing the air pressure and creating a load capacity, which is balanced with magnetic attraction. With this structure, the attitude of the rotary section in the bearing is made stable. The bearings can be mass-produced at low cost by molding, and the total thickness of the motor can be reduced. The current required for operating the motor is reduced. Therefore, the motor according to the invention is particularly suitable for small, rotary memory devices such as magnetic or optical disk devices, or cooling fans for CPUs.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An air dynamic bearing motor, comprising:
    a shaft having a diminishing conical taper surface;
    a sleeve having a conical concavity opposite the shaft;
    and means for generating magnetic attraction between one end of the shaft and a cone apex of the sleeve, including a permanent magnet and a magnetic material, the magnet being provided in one of the shaft and the sleeve and the magnetic being provided in the other one thereof; wherein
    a plurality of grooves are formed on at least a conical taper surface of one of the shaft and the sleeve, the grooves being provided for creating load capacity when the motor rotates, whereby rotating parts of the motor are supported by axial components of the load capacity balanced with said magnetic attraction.

2. The air dynamic bearing motor according to claim 1, wherein the magnetic attraction generating means comprises a permanent magnet held within the shaft and a magnetic material provided in the sleeve, and wherein said permanent magnet is initially held movably with a stabilizing tolerance to overcome said magnetic attraction, and is adjustably fixed in position at the time of assembling such that the permanent magnet makes contact with the sleeve when the motor is stationary, and
    wherein said permanent magnet and said sleeve are brought out of contact when the motor is rotating, by a distance equal to or shorter than an axial flying height determined on conical surfaces of the shaft and sleeve.

3. The air dynamic bearing motor according to claim 1, wherein the magnetic attraction generating means comprises a permanent magnet held within the shaft and a magnetic material provided in the sleeve, the permanent magnet being assembled with the shaft such that said permanent magnet is initially held movably with a stabilizing tolerance to overcome said magnetic attraction as being substantially protruded from one end of the shaft, and is pressed into the shaft by a pressure larger than the magnetic attraction applied from both ends of the shaft and the sleeve to a predetermined position, where the cone apex of the sleeve or a plate spring interposed between the apex of the sleeve and the permanent magnet is resiliently deformed, wherein, when the motor is stationary the permanent magnet and the apex of the sleeve or the plate spring make contact with each other, and wherein said permanent magnet and the apex of the sleeve or the plate spring are brought out of contact when the motor is rotating, by a distance equal to or shorter than an axial flying height determined on conical surfaces of the shaft and sleeve.

4. The air dynamic bearing motor according to claim 1, further including a crown of a predetermined number of micrometers provided on the conical taper surface of one of the shaft and the sleeve so as to make the clearance between the opposite taper surfaces of the shaft and the sleeve be minimum at an axially intermediate region, wherein the grooves are spiral grooves and provided on one or both sides of said axially intermediate region where the clearance between the shaft and the sleeve is minimum, for pumping the air towards said intermediate region.

5. The air dynamic bearing motor according to claim 4, further including a circumferential groove provided on the conical taper surface of at least one of the shaft and the sleeve where the clearance therebetween is minimum because of the crown.

6. The air dynamic bearing motor according to claim 1, wherein the grooves are formed on both opposite conical taper surfaces of the shaft and the sleeve at radially opposite positions, the grooves having different angular lengths from each other in a circumferential direction.

7. The air dynamic bearing motor according to claim 1, further including a ring-shaped member fixed to an end of said sleeve, and an annular recess provided in the fixed part opposite to the sleeve and making engagement with the ring-shaped member so as to restrict axial movable distance of the rotating parts.

8. The air dynamic bearing motor according to claim 7, wherein the ring-shaped member is fixed to the end of the sleeve by any one of interfitting, bonding, and welding, access holes being provided in one of a fixed member opposite said the end of the sleeve for enabling the fixing of the ring-shaped member to be performed.

9. The air dynamic bearing motor according to claim 8, further including a means for establishing coupling engagement between the ring-shaped member and the sleeve end, wherein the ring-shaped member is coupled to one end of the sleeve with a free peripheral portion thereof being pressed, through the access hole, to be resiliently deformed and abutted onto an end face of said annular recess, and wherein said resilient deformation of the ring-shaped member determines a permissible range of the axial displacement of the rotating parts.

* * * * *